US008667853B2

(12) United States Patent
Rieder et al.

(10) Patent No.: US 8,667,853 B2
(45) Date of Patent: Mar. 11, 2014

(54) MEASURING TRANSDUCER OF VIBRATION-TYPE WITH TWO COUNTEROSCILLATOR ARMS

(75) Inventors: Alfred Rieder, Landshut (DE); Rainer Lorenz, Lorrach (DE); Michael Wiesmann, Freising (DE)

(73) Assignee: Endress + Hauser Flowtec AG, Reinach (CH)

( * ) Notice: Subject to any disclaimer, the term of this patent is extended or adjusted under 35 U.S.C. 154(b) by 459 days.

(21) Appl. No.: 13/027,407

(22) Filed: Feb. 15, 2011

(65) Prior Publication Data

US 2011/0197681 A1    Aug. 18, 2011

(30) Foreign Application Priority Data

Feb. 16, 2010  (DE) .......................... 10 2010 001 973

(51) Int. Cl.
  *G01F 1/84*  (2006.01)
(52) U.S. Cl.
  USPC .................................................... 73/861.355
(58) Field of Classification Search
  None
  See application file for complete search history.

(56) References Cited

U.S. PATENT DOCUMENTS

| 7,325,462 B2 * | 2/2008 | Bitto et al. | 73/861.355 |
| 7,360,451 B2 * | 4/2008 | Bitto et al. | 73/861.355 |
| 2010/0257943 A1 * | 10/2010 | Huber | 73/861.357 |
| 2011/0016990 A1 * | 1/2011 | Huber et al. | 73/861.357 |
| 2011/0023624 A1 * | 2/2011 | Huber et al. | 73/861.357 |

FOREIGN PATENT DOCUMENTS

| DE | 41 43 361 A1 | 3/1993 |
| DE | 10 2006 062 600 A1 | 7/2008 |
| DE | 10 2007 051 420 A1 | 10/2008 |
| WO | WO 02/099363 A1 | 12/2002 |
| WO | WO 2007/074014 A1 | 7/2007 |

* cited by examiner

*Primary Examiner* — Harshad R Patel
(74) *Attorney, Agent, or Firm* — Bacon & Thomas, PLLC

(57) ABSTRACT

Measuring transducer of vibration-type for a fluid flowing in a pipeline. The measuring transducer includes, in such case, a curved measuring tube for conveying the fluid, a counteroscillator having two counteroscillator arms, which are arranged on both sides of the measuring tube, and which, in each case, essentially follow the curve of the measuring tube, and which are coupled to one another in such a manner, that, during operation, they oscillate in phase with one another, and which are affixed to the measuring tube on the inlet side and outlet sides for forming corresponding coupling zones. The measuring transducer also includes an exciter mechanism, via which, during operation, the measuring tube and the counteroscillator are excitable to oscillations of opposite phase to one another. In such case, the counteroscillator arms are formed from a different material than the measuring tube, and the material of the counteroscillator arms has a thermal expansion coefficient essentially equal to that of the material of the measuring tube.

13 Claims, 3 Drawing Sheets

MEASURING TRANSDUCER OF VIBRATION-TYPE WITH TWO COUNTEROSCILLATOR ARMS

TECHNICAL FIELD

The present invention relates to a measuring transducer of vibration-type for a fluid flowing in a pipeline. The measuring transducer is, in such case, especially embodied for application in a Coriolis flow measuring device. As is generally known from the technical field, in Coriolis flow measuring devices, the Coriolis principle is utilized, according to which, whenever, in a system, a rotating and a straight line mass movement extending at least partially perpendicular to the rotational axis superimpose on each other, an additional force, the Coriolis force, acts on the moved mass.

BACKGROUND DISCUSSION

Coriolis flow measuring devices are, in such case, insertable as In-line-measuring devices into a pipeline, such as, for example, a process line of an industrial plant. Determinable via Coriolis flow measuring devices is at least one parameter, such as, for example, a mass flow, a density, a viscosity, etc., of the fluid flowing in the pipeline. For this, the measuring transducer includes at least one measuring tube, which, during use, is excited to oscillations by an exciter mechanism. In such case, it is especially known to use curved measuring tubes.

As is known, curved measuring tubes can, in the case of being excited to bending oscillations according to a first particular oscillation form (wanted mode), effect Coriolis forces in the fluid flowing through. As the first particular oscillation form of the curved measuring tube, in which the measuring tube is excited, the fundamental mode of the bending oscillation is usually selected. In the fundamental mode of the bending oscillation, the measuring tube moves in a pendulum-like manner at a lowest possible resonance frequency about an imaginary longitudinal axis of the measuring transducer in the manner of cantilever clamped at one end. Due to the Coriolis forces occuring, oscillations are superimposed with an equal frequency on the wanted mode according to at least one second particular oscillation form (Coriolis mode). In the Coriolis mode, the measuring tube also performs rotary oscillations about a vertical axis arranged perpendicular to the longitudinal axis, the vertical axis especially extending in the plane defined by the curved measuring tube. Due to the superpositioning of the wanted and Coriolis modes, the oscillations of the measuring tube, registered on the inlet side and outlet side by means of a sensor arrangement, have a measurable phase difference. This phase difference is, among other things, dependent on the mass flow.

An important aspect during use of Coriolis flow measuring devices is the fact that these are largely decoupled from the respective connected pipeline, so that, if possible, no oscillations are conveyed into the pipeline, as oscillations introduced into the pipeline lead, among other things, to reflections, which then, in turn, can negatively influence the measurement signal. Accordingly, the requirement is placed upon a measuring transducer that it have an even balance. This means that, if possible, no forces and/or oscillations of the measuring transducer are transferred into the adjoining pipeline. For this, various concepts are already known.

One known concept is to provide two parallelly flowed through, curved measuring tubes, which, as a rule, are arranged symmetrically to one another with respect to a plane extending between the two measuring tubes. In the case of this concept, on the inlet side and outlet side of the measuring tubes, distributor pieces are in each case required, which are comparatively complex to manufacture and which, depending on the fluid used, can display a tendency toward accretion formation and toward clogging.

Along with that, it is known to provide, in addition to a single, flowed-through, curved measuring tube, a counteroscillator, which likewise is excited to oscillations. The counteroscillator is, in such case, to be matched to the oscillation characteristics of the measuring tube in such a manner, that as even a balance of the measuring transducer as possible is produced. The counteroscillator is, in such case, matched as a rule to a reference condition, which is formed by a measuring tube filled with water. If the measuring tube is flowed through by a fluid or medium of a different density, as the density difference increases, the balance becomes more uneven, and the accuracy of the measurement is reduced. From this arises another requirement for the measuring transducer with its counteroscillator, namely that these have a high accuracy of measurement and an even balance across as broad a density range for the particular fluid as possible.

In WO 2007/074014 A1, a concept is described, in the case of which the counteroscillator is formed by two counteroscillator plates arranged laterally to a curved measuring tube. In WO 2002/099363 A1 a concept is described, in the case of which is provided lateral to a curved measuring tube a counteroscillator extending essentially parallel to the measuring tube. Easily enabled both in the case of the measuring transducer from WO 2007/074014 A1 as well as in the case of the measuring transducer from WO 2002/099363 A1 is a pendulum-like movement of an entire inner part—which at least the measuring tube and the counteroscillator have—about a longitudinal axis of the measuring transducer under a torsion of two connecting tube pieces adjoining on the measuring tube.

In the publication DE 10 2007 051 420 A1, a Coriolis mass flow measuring device with a straight measuring tube made of a corrosion-resistant material is described. Stabilizing elements, which are coupled with the measuring tube via add-on parts connected directly with the measuring tube, are, in such case, formed from a different metal than the measuring tube. The metal of the stabilizing elements has a coefficient of thermal expansion matched to the metal of the measuring tube.

If the fluid to be measured is formed by a corrosive medium, the components of the measuring transducer which come in contact with the corrosive fluid must then be formed from corrosion-resistant material. Especially in the case of highly corrosive media, tantalum is very well-suited as such a corrosion-resistant material. Tantalum is, however, comparatively expensive. In the case of use of a counteroscillator, this counteroscillator must display as close to the same oscillatory behavior as the curved measuring tube as possible in the case of the different use conditions. This can, among other things, be achieved in that the counteroscillator is formed from the same material as the measuring tube and has a similar or identical geometry. If an expensive material and/or a material difficult to process during manufacturing is generally used as the material for the measuring tube, a corresponding embodiment of the counteroscillator can lead to high material costs and/or to a relatively high manufacturing effort, which then leads to high costs.

SUMMARY OF THE INVENTION

On the basis of these considerations, the object of the present invention is to provide a measuring transducer of vibration-type which has an even balance. At the same time, the measuring transducer should be manufacturable in a cost effective manner, especially when special materials are to be used for the measuring tube due to the provided use conditions.

The object is achieved by a measuring transducer of vibration-type for a fluid flowing in a pipeline. The measuring transducer has, in such case, a curved measuring tube for conveying the fluid, a counteroscillator with two counteroscillator arms, and an exciter mechanism, via which, during operation, the measuring tube and the counteroscillator are excitable to oscillations opposite phase to one another. The counteroscillator arms are arranged on both sides of the measuring tube; they essentially follow, in each case, the curve of the measuring tube; they are coupled to one another in such a manner, that, during operation, they oscillate in phase with one another; and they are affixed on the measuring tube on the inlet side and outlet side, forming corresponding coupling zones. Additionally, the counteroscillator arms are formed from a different material than the measuring tube, wherein the material of the counteroscillator arms has essentially the same thermal expansion coefficient as the material of the measuring tube.

In the present invention—especially in those cases, in which the measuring tube, due to the provided use conditions, is to be formed from a special material which, in given cases, is expensive and/or difficultly to process—the use of more cost effective and/or easier to processed materials for the counteroscillator arms can be provided. For the counteroscillator arms can especially be selected a material, which can be processed well in combination with the material of the measuring tube. In such case is selected for the counteroscillator arms a material, which has essentially the same thermal expansion coefficient as the material of the measuring tube. In this way, the occurrence of mechanical stresses, which are caused due to a different thermal expansion of the measuring tube and the counteroscillator arms and which are brought about by fluctuations in the application temperature, can be prevented during use. Additionally, the occurrence of mechanical stresses, which are caused by the high temperature differences during manufacturing, can be prevented.

Compared to the use of two parallelly flowed-through, curved measuring tubes, the provision of only one measuring tube has the advantage that markedly lower material and manufacturing costs occur, when special materials are to be used for the components coming in contact with the fluid. For, in the case of a concept with two parallelly flowed-through, curved measuring tubes, at least the two measuring tubes as well as the two distributor pieces must, in each case, be manufactured from the special material. Additionally, in the case of the distributor pieces, there exists the danger of an accretion formation and/or a clogging.

An advantage of a curved measuring tube as compared to a straight measuring tube lies in the fact that the measuring tube can be embodied in a relatively long manner, and thus can be achieved a high sensitivity of the measuring transducer in the case of a relatively short installed length and in the case of a relatively low exciter energy. Compared to a straight measuring tube (and, in given cases, a counteroscillator embodied in a straight form) the application of a curved measuring tube and essentially correspondingly curved counteroscillator arms additionally has the advantage, that the entire system of the measuring tube and counteroscillator arms can react comparatively softly and elastically to occurring stresses in the axial direction. Axial stresses occur, in such case, especially in the case of temperature fluctuations during use, and are, among other things, brought about by the thermal expansion of the connecting tube pieces of the measuring tube and the counteroscillator adjoining on the measuring tube. In this way is prevented a plastic deformation of components of the measuring transducer, especially of the connecting tube pieces (via which the measuring tube communicates with the pipeline) and, in given cases, also of the measuring tube and the counteroscillator arms, which would disadvantageously affect the accuracy of measurement. This advantage is also achieved in comparison to the above explained measuring transducer, in the case of which the counteroscillator is formed by two counteroscillator plates arranged laterally to a curved measuring tube, as the embodiment of the counteroscillator as two counteroscillator plates forms a relatively stiff arrangement with respect to occurring axial stresses, so that especially the danger of a plastic deformation of the connecting tube pieces exists. Additionally, in the case of a curved shape, stresses, which are brought about in the region of the measuring tube due to a different thermal expansion between the measuring tube and counteroscillator, are lower than in the case of a straight shape for the measuring tube and for the counteroscillator, as well as lower than in the case of the embodiment of the counteroscillator as two counteroscillator plates. In this way (depending on requirements and field of use), in given cases, larger differences in the thermal coefficients of expansion between the material of the measuring tube and the material of the counteroscillator are possible.

Compared to an arrangement as described in WO 2002/099363 A1, the embodiment of the measuring transducer with the two counteroscillator arms of the invention has the advantage, that a completely symmetric arrangement relative to a symmetry plane defined by the curved measuring tube is implementable in a simple manner. This is advantageous with regard to an even balance. Thereby can especially be prevented the introduction of oscillations into the adjacement pipeline and the occurrence of undesired reflections.

As is explained above, the measuring transducer is especially embodied in such a manner, that it is applicable in a Coriolis flow measuring device. The fluid to be measured can, in such case, especially be liquid, gaseous or also multiphase. In such case, the fluid can also entrain gas inclusions and/or solid particles and/or have various viscosities. In the case of the curved measuring tube, various forms are possible. Especially applied are U-, V-, W-, Ω- and Δ-shaped measuring tubes, wherein in the case of a Δ-shaped measuring tube, the inlet and the outlet are formed in a "broken open" corner of the Δ. The counteroscillator arms can extend parallel to the curved measuring tube. They can, however, also form a larger or a smaller arc than the measuring tube. Additionally, the distance of the counteroscillator arms from the measuring tube in a direction perpendicular to a plane which is defined by the curved measuring tube can vary across the curve of the measuring tube. Additionally, it can also be provided that the thickness and the cross sectional area of the counteroscillator arms vary across their curve.

A coupling of the two counteroscillator arms in such a manner, that, during operation they oscillate in phase with one another, can especially be implemented through a coupling (between the two counteroscillator arms) in the region between the two coupling zones (in which the counteroscillator arms are coupled to the measuring tube). The coupling is especially implemented via at least one stiff connection between the two counteroscillator arms. An "exciting of the measuring tube and the counteroscillator arms to oscillations opposite phase to one another" does not absolutely mean that these oscillate exactly opposite phase. Rather, this oscillation can also have a (as a rule, slight) in phase part. This is, among other things, the case when the fluid to be measured has a density deviating from the reference density to which the measuring transducer was matched (as a rule, the matching occurs for a measuring tube filled with water). Besides the named exciter mechanism, as a rule, a sensor arrangement is also provided, which registers inlet-side and outlet-side oscillations of the measuring tube.

With "thermal expansion coefficient" reference is especially made to the linear thermal expansion coefficient $\alpha$, which gives the length difference relative to the total length by which a solid body changes in the case of a temperature change of one Kelvin. An "essentially equal thermal expansion coefficient" does not mean that the material of the counteroscillator arms must have exactly the same thermal expansion coefficient as the material of the measuring tube. Rather, the thermal coefficients of expansion of the materials should lie so near to one another, that, in the case of a predetermined use temperature range (as a rule, in the range of −50° to +200°), the different expansions of the measuring tube and the counteroscillator arms caused thereby lie in an acceptable range. Which range of expansions is acceptable, is, in such case, is also determined by additional influencing factors. Important influencing factors are, in such case, especially the particular shape of the measuring tube and the counteroscillator arms, the modulus of elasticity (also referred to as Young's modulus) the particular materials used as well as the strength of the particular installed materials. For through these influencing factors is, among other things, in part determined from which expansion differences between the measuring tube and the counteroscillator arms a plastic deformation, a material fatigue and/or a crack formation occurs in the case of the measuring tube and/or in the case of the counteroscillator arms. Additionally, during the selection the materials, the comparatively high temperature changes occurring during the manufacturing process are to be taken into consideration, since undesired stresses can also occur thereby, which can especially remain in the measuring transducer after a cooling event.

In a further development, the thermal expansion coefficient of the material of the counteroscillator arms and the thermal expansion coefficient of the material of the measuring tube differ by less than $5*10^{-6}$ $K^{-1}$. As a function of the requirements made and the additional influencing factors explained above, a markedly lesser difference in the thermal coefficients of expansion of the materials can, however, also be sensible. In an additional further development, a difference of less than $3*10^{-6}$ $K^{-1}$ is provided. Additionally, in experiments (in the case of a measuring tube made of tantalum and in the case of counteroscillator arms made of zirconium) very good results have been achieved in the case of a difference of less than $1*10^{-6}$ $K^{-1}$. Accordingly, in an additional further development, it is provided that the difference amounts to less than $1*10^{-6}$ $K^{-1}$.

In a further development, the counteroscillator and the measuring tube in each case have a wanted mode, in which they are excitable by the exciter mechanism. In such case, the resonance frequency of the wanted mode of the counteroscillator essentially corresponds to the resonance frequency of the wanted mode of the measuring tube. In this way is fulfilled an essential criterion for the measuring transducer to have an even balance during use. As is explained above, the wanted mode of the curved measuring tube is especially formed by the fundamental mode of the bending oscillation, in the case of which the measuring tube moves in a pendulum-like manner at a lowest possible resonance frequency (in the comparison to the higher order modes of the bending oscillation) about an imaginary longitudinal axis of the measuring transducer, in the manner of a cantilever clamped at one end. Since this pendulum-like movement is also accompanied by an alternating torsion in the region of the longitudinal axis, the correct name for this bending oscillation would actually be "bending-torsional oscillation". In the following, for purposes of simplicity, this oscillation is referred to as a "bending oscillation". In a corresponding manner, the wanted mode of the counteroscillator is also formed by this fundamental mode of the bending oscillation (of the counteroscillator).

In such case, it is especially provided that the resonance frequencies correspond exactly in the case of a reference condition, which, as a rule, is formed via a measuring tube filled with water. If the fluid to be measured has a density deviating from that of water, the resonance frequencies then no longer exactly correspond. As a rule, measuring transducers are designed for a density range of the reference density$\pm 1000$ $kg/m^3$, thus, in the present case, for a density range of 0 $kg/m^3$ to 2000 $kg/m^3$. An equal resonance frequency is thereby especially reached in that the counteroscillator has the same ratio of total mass to stiffness as the (as a rule, filled with water) measuring tube. Both in the case of the total mass of the measuring tube as well as in the case of the total mass of the counteroscillator are to in each case be taken into consideration add-on parts mounted on the measuring tube or on the counteroscillator. The stiffness of the measuring tube or of the counteroscillator is partially material-dependent, and is determined by the modulus of elasticity of the respective material. Moreover, the stiffness is influenced by the shaping, wherein the stiffness increases with an increasing diameter Ø (in the case of a pipe with $Ø^3$). Accordingly, the stiffness can be set by a corresponding shaping and material selection.

For an even balance, not only the same resonance frequency of measuring tube and counteroscillator explained above is of meaning. A second condition for, in the region of the connections of the measuring transducer to the adjoining pipeline, no forces being transferred from the measuring transducer into the pipeline is that the moments (bending moments) resulting during use from the oscillation of the two counteroscillator arms are introduced into the coupling zones at a same working angle as the moments (bending moments) resulting from the oscillation of the measuring tube. A third condition is that, during use, the ratio of the moment (bending moment) introduced via the counteroscillator arms into a coupling zone to the force (transverse force) introduced into the coupling zone via the counteroscillator arms, which (i.e. the moment and the force), in each case, result from the oscillation of the two counteroscillator arms, is equal to the ratio of the moment (bending moment) introduced via the measuring tube into the coupling zone to the force (transverse force) introduced into the coupling zone via the measuring tube, which (i.e. the moment and the force), in each case, result from the oscillation of the measuring tube. Accordingly, in further developments, it is provided that the two counteroscillator arms are matched in their curve and in their mass distribution (wherein add-on parts mounted on the counteroscillator arms are also to be taken into consideration) to the measuring tube (wherein add-on parts mounted on the measuring tube are also to be taken into consideration), so that they also fulfill this second and/or third condition.

In a further development, the material of the counteroscillator arms has a lower density and a lower modulus of elasticity than the material of the measuring tube. In this way, in relatively simple manner, two counteroscillator arms can be provided, and simultaneously, the above named three conditions for an even balance can be fulfilled, without a heavy embodiment of the measuring transducer being caused thereby. Such a lower modulus of elasticity and such a lower density are, however, not compulsory. Rather, the material of the counteroscillator can also have a higher density and/or a higher modulus of elasticity. The stiffness of the counteroscillator can, for example, be matched by a corresponding shaping of the counteroscillator arms. In such case, it is, however, to be taken into consideration, that in part—such as, for example, in the case of tubular counteroscillator arms—often only predetermined geometries (especially regarding ratio of diameter to wall thickness) are obtainable on the market.

As regards the damping characteristics, a comparatively heavy embodiment of the counteroscillator can indeed be advantageous. In the case of the concept described in WO 2007/074014 A1 with two counteroscillator plates, especially, these are comparatively heavily embodied. Problematic, however, in such case, is that in the case of shocks or shakings, this can lead to an increased load and, in given cases, to an undesired deformation of the connecting tube pieces. If a material with a lower density is selected for the material of the counteroscillator arms, a relatively light embodiment of the measuring transducer is especially achieved. According to a further development, it is especially provided that a ratio of the mass of the counteroscillator (including, in given cases, supplemental weights and add-on parts provided) to the mass of the empty measuring tube is smaller than two.

Preferably, both the counteroscillator as well as the measuring tube are formed from a metal. In a further development, the measuring tube is formed from a first metal or from an alloy based on the first metal, and the two counteroscillator arms are formed from a second metal different from the first metal, or from an alloy based on the second metal. "Based on a metal" means, in such case, especially that the alloy concerned is composed of the relevant metal by more than 50 wt. %. The first metal, or the alloy based on the first metal, is especially a corrosion-resistant material. Alternatively, it can, however, also be a material with other or additional properties for special applications.

In a further development, the first metal is tantalum. Tantalum has, in such case, an excellent corrosion resistance and is especially well-suited for strongly corrosive fluids. In the case of tantalum, alloys based on tantalum are especially used. Alloys of tantalum and tungsten can especially be applied, in the case of which tungsten forms a part of 2.5 wt. % to 10 wt. %. Among other things, alloys of tantalum and niobium can also be applied, in the case of which niobium, in a corresponding manner, forms a part of 2.5 wt. % to 10 wt. %. If a high corrosion resistance is desired, then the added part is, as a rule, relatively small (e.g. in the area of 2.5 wt. %). Accordingly, an alloy based on tantalum includes, according to a further development, a part of at least 87 wt. % of tantalum, especially a part of at least 95 wt. % of tantalum. Depending on requirements, another element can, however, also be used as the first metal. For example, also zirconium, or, in given cases, an alloy based on zirconium, which also has a relatively good corrosion resistance, can be suitable as a material for measuring tube.

In a further development, the second metal is zirconium. As zirconium (or, in given cases, an alloy based thereon) has a lower density and a lower modulus of elasticity than tantalum (or, in given cases, an alloy based thereon) and the thermal coefficients of expansion a of these metals (or alloys based thereon) lie very near to one another (difference of less than $1*10^{-6}$ $K^{-1}$), zirconium (or, in given cases, an alloy based thereon) is especially well-suited as a material for the counteroscillator arms, and tantalum (or, in given cases, an alloy based thereon) as a material for the measuring tube in this material pairing. As a rule, in the case of zirconium, alloys based on zirconium are used, to which at least 4-5 wt. % hafnium is added. Among others can also be used alloys, to which are also added 1-2 wt. % tin or, alternatively, 2-3 wt. % niobium. An alloy based on zirconium includes, according to a further development, a part of at least 90 wt. % of zirconium, especially a part of at least 95 wt. % of zirconium. Depending on requirements, however, another element can also be used as the second metal. Especially an alloy based on a mixture of iron, nickel and cobalt (also referred to as Kovar or Covar) can also be suitable as a material for the counteroscillator arms, in the case of which, depending on the parts making up the alloy, a correspondingly matched thermal expansion coefficient is also implementable.

In a further development, each counteroscillator arm has at least one supplemental weight, which is arranged offset inwardly from a centroidal axis of the counteroscillator arm with respect to a total curvature of the counteroscillator arm. Through the provision of such supplemental weights, the mass and the mass distribution of the counteroscillator arms can, in a simple manner, be matched in such a way that an even balance is achieved. Via a suitable mounting of the supplemental weights, the counteroscillator arms can especially be matched in such a manner, that the counteroscillator, as explained above, has the same resonance frequency, the same working angle and the same ratio of moment and force as the measuring tube. In such case are preferably provided on each counteroscillator arm a number of discrete and separately mounted supplemental weights, which especially are distributed across the length of the counteroscillator arm. The supplemental weights can especially be mounted removably on the counteroscillator arms, so that, in given cases, the mass distribution can be changed in a simple manner (for example, when the measuring transducer for a fluid with a density different from water is applied, and the mass distribution c should be matched to this). Alternatively, however, the supplemental weights can also be secured permanently to the counteroscillator arms, such as, for example, via soldering or welding. Alternatively or in supplementation to discrete and separately placed supplemental weights, a desired mass distribution can also be implemented by forming corresponding longitudinal or annular grooves in the counteroscillator arms. With "total curvature", reference is made, in such case, to the total extent of the counteroscillator arms between the two coupling zones (z.B: U-, V-, W-, Ω- or Δ-shaped), wherein the counteroscillator arms can also locally exhibit a different curvature. In that at least one supplemental weight is arranged offset inwardly (i.e. offset toward the longitudinal axis) from a centroidal axis of the counteroscillator arm (centroidal axis without consideration of supplemental weights or other add-on parts) with respect to a total curvature of the counteroscillator arm, it is achieved that the center of gravity is offset nearer to the longitudinal axis by the supplemental weights. This has an advantageous effect with respect to an even balance.

In a further development, each counteroscillator arm has a cross sectional profile which remains essentially the same across its length. In such case, it can be provided that the cross section of the curved counteroscillator arms tapers in the region of the extreme of the curve (especially in a region located centrally between the two coupling zones). In this way, the counteroscillator arms can react even more softly and elastically to stresses occurring in the axial direction, so that a plastic deformation of components of the measuring transducer, especially of the connecting tube pieces, can be prevented. Alternatively, the cross sectional profile can have across its length a cross sectional profile remaining exactly the same. The counteroscillator arms can especially in each case be formed as an open or closed hollow profile (, for example, O-, U- or V-shaped), which enables a relatively high stiffness in the case of a comparatively low weight. In a further development, each counteroscillator arm is embodied tubularly. In this way, the counteroscillator arms have a geometry corresponding to the measuring tube, so that an even balance is relatively easily implementable. Additionally, a tube form is advantageous as regards the manufacturing of the counteroscillator arms, since the risk of fractures or crack formation is relatively small, and high empirical values exist in the processing of pipes (especially in the case of the tube bending).

In a further development, the measuring transducer, on the inlet and outlet side of the measuring tube, has, in each case, connecting tube pieces, via which the measuring tube communicates during use with the respective pipeline, and which are at least sectionally oriented along a shared longitudinal axis, wherein, via the connecting tube pieces, an inner part, which at least the measuring tube, the counteroscillator and the exciter mechanism have, is held, oscillatably, in such a manner, that a pendulum-like oscillation of the inner part about the longitudinal axis under torsion of the two connecting tube pieces is enabled. Such a pendulum-like oscillation is desirable, in order to convert possibly occurring balance disturbances into such a pendulum-like movement, and therewith to prevent the occurrence of undesired oscillation forms, which can negatively influence the measurement signal. In order to be able to excite such a pendulum-like oscillation as easily as possible, and to accordingly be able to suppress strongly undesired oscillation forms, according to a further development, it is provided that a torsional stiffness of the connecting tube pieces and a mass distribution of the inner part in the region between the two connecting tube pieces are matched in such a manner, that a first torsional oscillator, with which is associated a first half of the inner part in the region of the first connecting tube piece, as well as a second torsional oscillator, with which is associated the second half of the inner part in the region of the second connecting tube piece, have a natural resonance frequency, which essentially corresponds to the resonance frequency of the wanted mode of the measuring tube. This concept for implementing a pendulum-like oscillation is described in the documents WO 2002/099363 A1 and WO 2007/074014 A1. In that the measuring tube and the counteroscillator are, as a rule, excited to the resonance frequency of the wanted mode, the excitation frequency corresponds, as a rule, also to the resonance frequency of the pendulum-like oscillation of the two torsional oscillators, so that these are relatively easily excited in this pendulum-like oscillation.

For forming the "first half" and the "second half" of the inner part, the inner part is divided into two inner part halves by a plane (which preferably forms a symmetry plane), which extends perpendicular to the imaginary longitudinal axis of the measuring transducer and extends through the extreme of the curved measuring tube. These two halves are then regarded as separate (but coupled to one another) torsional oscillators. A matching of the mass distribution of the inner part can especially occur via correspondingly with mass embodied couplers in the region of the coupling zones, via supplemental weights and/or via rotary mass balancing bodies embodied separately from the couplers. The influencing of the mass distribution of the counteroscillator arms caused thereby is also to be taken into consideration as regards the production of an even balance between the measuring tube and counteroscillator arms.

In a further development, the measuring transducer includes a transducer housing, in which the inner part is held, oscillatably, via the two connecting tube pieces. The transducer housing serves, in such case, as a stable suspension for the inner part and for decoupling the oscillations of the pipeline.

In a further development, the two counteroscillator arms, the measuring tube, the coupling zones and the connecting tube pieces are arranged mirror-symmetrically with respect to a symmetry plane which is defined by the curve of the measuring tube. In this way, an even balance is supported. Additionally, according to a further development, it is provided that the two counteroscillator arms, the measuring tube, the coupling zones and the connecting tube pieces are also arranged mirror-symmetrical with respect to a symmetry plane which extends perpendicular to the imaginary longitudinal axis of the measuring transducer and extends through the extreme of the curved measuring tube.

The present invention relates additionally to a Coriolis flow measuring device—such as, for example, a Coriolis mass flow measuring device, a Coriolis mass flow/density measuring device or a Coriolis mass flow/density/viscosity measuring device—with a measuring transducer of the invention, which, in given cases, can also be embodied according to one or more of the above explained further developments. The measuring transducer of the invention is, in such case, due to its good dynamic balancing, also especially suitable in the case of fluctuating density of the fluid flowing through.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
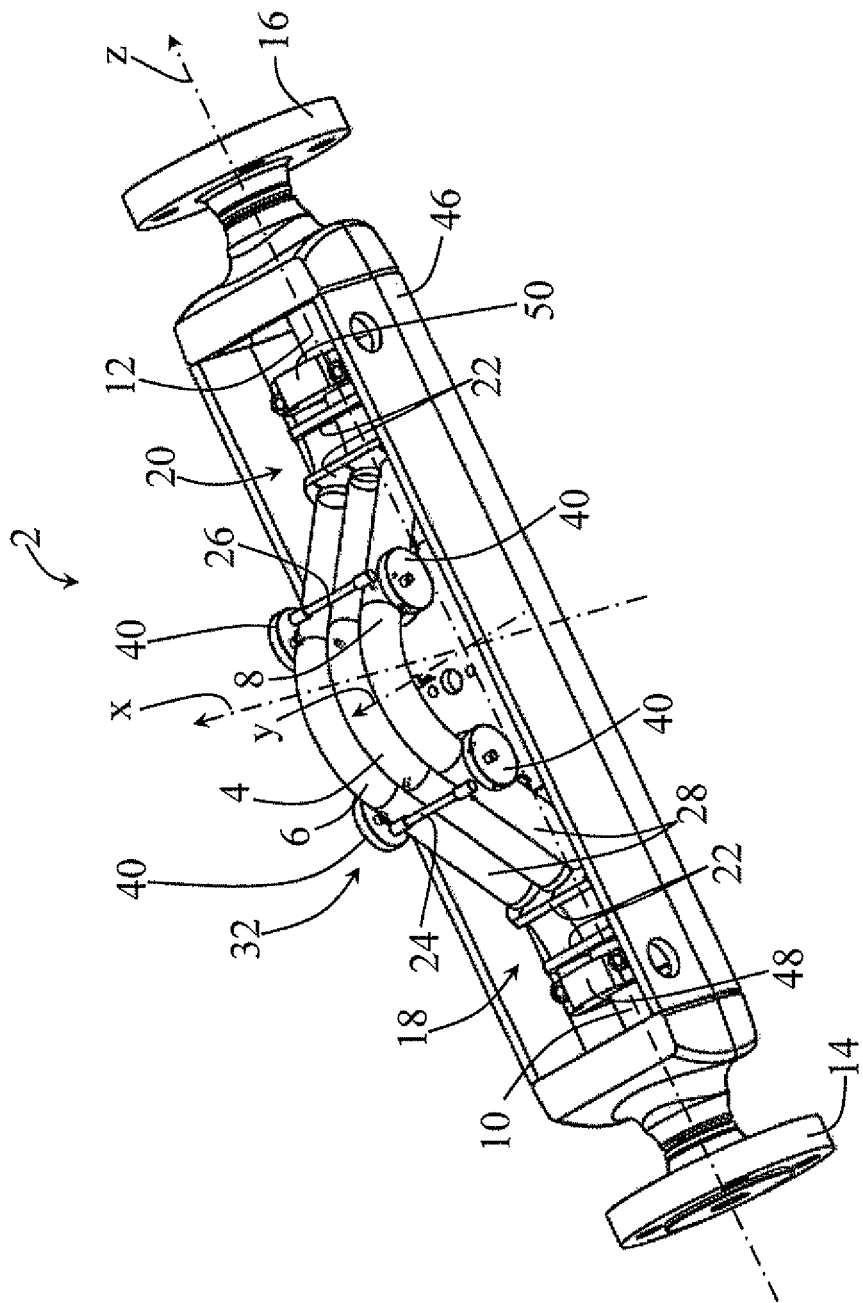
FIG. 1 is a perspective view of a measuring transducer according to a first form of embodiment of the invention with partially sectioned transducer housing.
Figure 2:
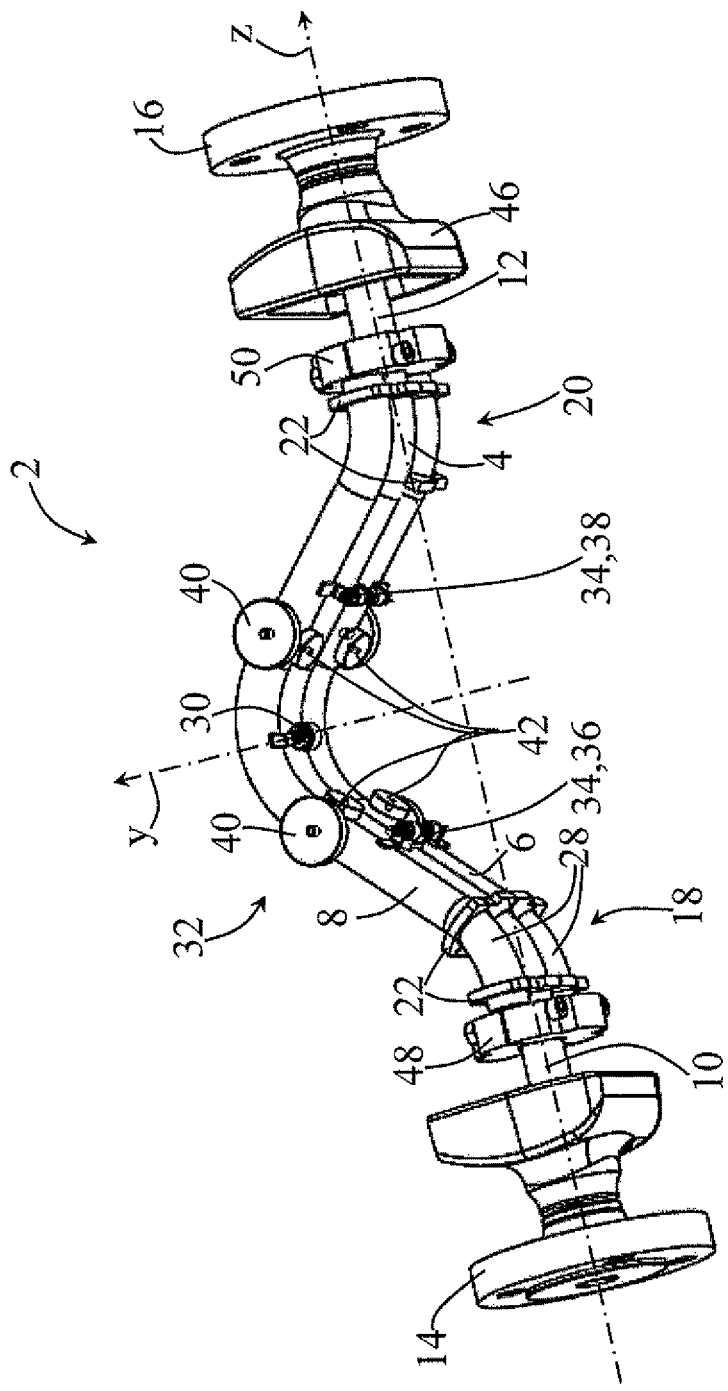
FIG. 2 is another perspective view of the measuring transducer illustrated in FIG. 1 with largely removed transducer housing.

As is evident on the basis of FIGS. 1 and 2, the measuring transducer 2, according to the illustrated form of embodiment, includes a (single) curved measuring tube 4, which essentially has the shape of a rounded V, and counteroscillator arms 6, 8 arranged on both sides of the measuring tube 4, which essentially follow the curve of the measuring tube 4. Connecting on the inlet and outlet sides of the measuring tube 4 are in each case connecting tube pieces 10, 12, via which the measuring tube 4 communicates during use with the respective pipeline. The connecting tube pieces 10, 12, which are essentially straight, are, in such case, essentially oriented along a longitudinal axis z of the measuring transducer, which runs through the inlet side and outlet side connections 14, 16 of the measuring transducer 2, and are also arranged on this. The connecting tube pieces 10, 12 can, in such case, be embodied as a single piece with the measuring tube 4, or be subsequently secured on the measuring tube 4, e.g. via welding or soldering.

During operation, the measuring transducer 2 is connected to a fluid-conveying pipeline as an In-line measuring device. The measuring tube 4 and the connecting tube pieces 10, 12 are then flowed through by the fluid to be measured. The measuring tube 4 is caused during operation to vibrate and, in such case, oscillating about a static resting position, is repeated elastically deformed. Depending on application, the measuring tube 4 can especially have an inner diameter in the region of 6-50 mm, wherein the inner diameter of the measuring tube, as a rule, is slightly smaller than the inner diameter of the inlet-side and outlet-side connections, and therewith also smaller than the inner diameter of the pipeline to be connected.

The counteroscillator arms 6, 8 are, in each case, embodied tubularly, and have, in the illustrated example of an embodiment, essentially the same diameter and the same wall thickness as the measuring tube 4. On the inlet side and outlet side of the measuring tube 4, the counteroscillator arms 6, 8 are, in each case, affixed on the measuring tube 4, forming corresponding coupling zones 18, 20. In the illustrated example of an embodiment, this affixing is, both on the inlet side as well as on the outlet side, in each case formed by a pair of node plates 22 spaced apart from one another in the direction of the longitudinal axis. The distance between the two counteroscillator arms 6, 8 is held constant in the region between the two coupling zones 18, 20 by at least one cross brace, wherein, in the illustrated example of an embodiment, two cross braces 24, 26 are provided. In this way, an in-phase oscillation of the two counteroscillator arms 6, 8, which, to the extent that common reference is made to these (including, in given cases, add-on parts provided thereon), are referred to as the "counteroscillator" 28.

For facilitating the explanation of the arrangement and the symmetries of the measuring transducer, the subsequently explained coordinate system is used. Perpendicularly to the longitudinal axis z of the measuring transducer extends the vertical axis y, which, like the longitudinal axis z, extends within a plane which is defined the curved measuring tube 4. The vertical axis y extends, in such case, through the extreme of the curved measuring tube 4. The plane defined by the axes z and y forms, in such case, a symmetry plane, to which the two counteroscillator arms 6, 8, the measuring tube 4, the coupling zones 18, 20 and the connecting tube pieces 10, 12 are mirror-symmetrically arranged. Additionally, the vertical axis y, together with a transverse axis x extending perpendicular to the axes y and z, defines a symmetry plane, by which the measuring tube 4 as well as the two counteroscillator arms 6, 8 are, in each case, divided into measuring tube halves and counteroscillator halves arranged mirror-symmetrically to the symmetry plane.

As is evident on the basis of FIG. 2, for exciting the measuring tube 4 and the counteroscillator 28 is provided in the region of the extreme of the curved measuring tube 4 (i.e. in the region of the point of intersection between the measuring tube 4 and vertical axis y) on the inside of the curve of the measuring tube 4 an exciter mechanism 30, especially an electrodynamic exciter mechanism 30. In the case of the illustrated form of embodiment, the exciter mechanism 30 is formed by an electrodynamic exciter mechanism 30, which is operable by control electronics (not shown) in such a manner, that, by exerting a corresponding exciter force, it excites the measuring tube 4 and the counteroscillator 28 to oscillations opposite phase to one another. This exciter force can, in such case, be embodied bidirectionally or unidirectionally. Additionally, the exciter force can be adjusted with regard to its amplitude and frequency via the control electronics. The exciter force is, in the present form of embodiment, exerted relatively between the measuring tube 4 and the counteroscillator 28. The exciter mechanism 30 can only be arranged in an intermediate space between the measuring tube 4 and a counteroscillator arm 6.

There can, however, also in each case be provided in both intermediate spaces between the measuring tube 4 and each of the counteroscillator arms 6, 8 an exciter mechanism 30, which are then, in each case, operated opposite phase to one another.

For detecting the oscillations of the measuring tube 4, the measuring transducer 2 additionally includes a sensor arrangement 34, through which the oscillations of the measuring tube 4 are registered on the inlet side and on the outlet side, and are converted into corresponding sensor signals. As is commonly known in the technical field, the sensor arrangement 34 can especially have a first sensor 36 arranged on the measuring tube 4 on the inlet side, and a second sensor 38 arranged on the measuring tube 4 on the outlet side, which are likewise arranged on the inside of the curve of the measuring tube 4. In the present example of an embodiment, via the sensors 36 and 38, the oscillation of the measuring tube 4 relative to the counteroscillator 28 is registered.

In the case of the present example of an embodiment, the measuring tube 4 is formed from an alloy based on tantalum, wherein the part of tantalum amounts to at least 95 wt. %. Also the two connecting tube pieces 10, 12 are, in each case, formed from a corresponding alloy based on tantalum. The two counteroscillator arms 6, 8 are, in each case, formed from an alloy based on zirconium, wherein the part of zirconium amounts to at least 95 wt. %. As above is explained, for an even balance, the curve and the mass distribution of the counteroscillator arms 6, 8 are to be matched in such a manner, i) that the resonance frequency of the wanted mode of the counteroscillator 28 essentially corresponds to the resonance frequency of the wanted mode of the measuring tube 4;

ii) that, during use, the moments resulting from the oscillation of the two counteroscillator arms 6, 8 are introduced into the two coupling zones 18, 20 at a same working angle as the moments resulting from the oscillation of the measuring tube 4; and iii) that, during use, the ratio of the moment introduced via the counteroscillator arms 6, 8 into a coupling zone 18 or 20 to the force introduced into the coupling zone 18 or 20 via the counteroscillator arms 6, 8—which, in each case, result from the oscillation of the two counteroscillator arms 6, 8—is equal to the ratio of the moment introduced via the measuring tube 4 into the coupling zone 18 or 20 to the force introduced into the coupling zone 18, or 20 via the measuring tube 4, which, in each case, result from the oscillation of the measuring tube 4.

The amplitudes of the oscillation of the measuring tube 4 and the oscillation of the counteroscillator 28 set themselves automatically.

In order to achieve a coordination corresponding to the above named three conditions (i)-iii)), in the case of the illustrated form of embodiment, a number of supplemental weights are provided, which are correspondingly placed on the two counteroscillator arms 6, 8. In the present case, the supplemental weights are arranged between the exciter mechanism 30 and the two sensors 36, 38 of the sensor arrangement 34. Laterally (and lying opposite the measuring tube 4) on each counteroscillator arm 6, 8 are especially provided, in each case, two supplemental weights 40, which are essentially arranged on a centroidal axis of the counteroscillator arms 6, 8 (without taking into consideration possible add-on parts), and spaced apart from the extreme of the counteroscillator arms 6, 8. Additionally, on each counteroscillator arm 6, 8, are in each case provided two other supplemental weights 42, which are arranged offset inwardly from a centroidal axis of the counteroscillator arm with respect to a total curvature of the respective counteroscillator arm 6 or 8, and spaced apart from the extreme of the counteroscillator arms 6, 8. In the case of the illustrated form of embodiment, these additional supplemental weights 42 are, in each case, arranged on the inner side of the respective counteroscillator arms 6, 8. The above explained symmetries with respect to the symmetry plane defined by the y- and z-axis as well as with respect to the symmetry plane defined by the x- and y-axis are also fulfilled by the supplemental weights 40, 42 as well as through the cross braces 24, 26. In given cases, the exciter mechanism 30 and/or the sensor arrangement 34 and/or other add-on parts of the measuring tube 4 and of the counteroscillator 28 can also have these symmetries.

Figure 3:
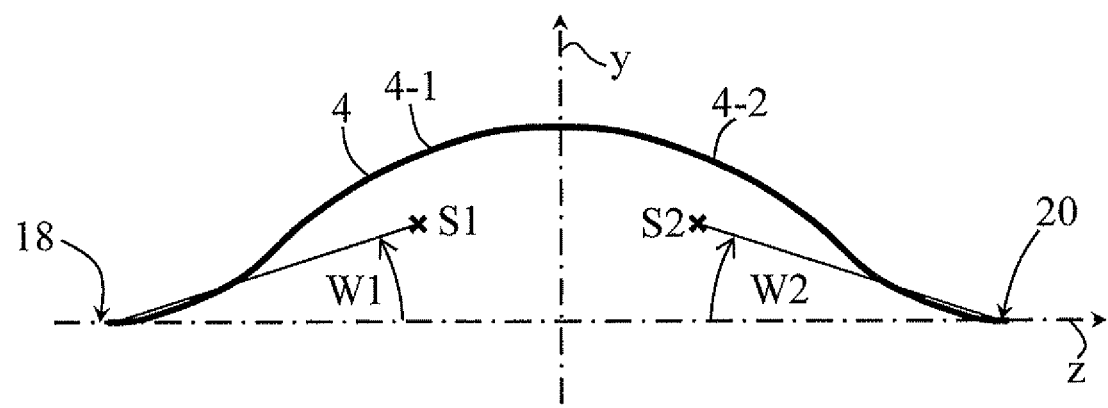
FIG. 3 is a schematic representation of a bent measuring tube for illustrating the division into two measuring tube halves.

As regards the above explained fulfillment of the second (ii)) and third (iii)) conditions for an even balance, a simplifying manner of looking at the situation is helpful. For explaining this simplifying manner of looking at the situation, in FIG. 3, only the curve of the centroidal axis of the measuring tube 4 is schematically presented. The measuring tube 4 is divided by the symmetry plane, which is defined by the x- and y-axis, into two measuring tube halves 4-1 and 4-2. In a corresponding manner, the counteroscillator 28 (not shown in FIG. 3) is also divided by this plane into two counteroscillator halves. The working angle (with reference to the second condition) and the ratio of moment and force (with reference to the third condition) are, in each case, determined for the measuring tube halves 4-1, 4-2 and for the counteroscillator halves.

For this is determined for a measuring tube half its center of gravity S1 (wherein, as a rule, a measuring tube 4 filled with water is assumed). The working angle W1 corresponds to the angle between a connecting line which extends from this center of gravity S1 to the coupling zone 18, and the longitudinal axis z of the measuring transducer 2. The working angle for the associated counteroscillator half is determined in a corresponding manner, wherein, in the case of the counteroscillator 28, supplemental weights 40, 42 possibly provided and other add-on parts (e.g. the cross braces 24, 26) must be taken into consideration. This working angle (of the measuring tube half and the associated counteroscillator half) are compared with one another. For the determining the ratio of moment and force (with reference to the third condition), in a corresponding manner, the moment (bending moment) acting (oscillating) in the center of gravity S1 or S2 of the measuring tube half 4-1 or 4-2 and the force (transverse force) acting (oscillating in phase with the moment) in this center of gravity S1, or S2 are determined, and the ratio is formed therefrom. The force (transverse force) acts, in such case, in FIG. 3, perpendicular to the illustrated plane of the drawing. In a corresponding manner, the ratio for the associated counteroscillator half is determined, and these ratios are compared with one another. A corresponding manner of proceeding can also be undertaken for determining the working angle (with reference to the second condition) and the ratio of the moment to the force (with reference to the third condition) for the other measuring tube half 4-2 (working angle W2; center of gravity S2) and the other counteroscillator half. In such case, due to the symmetry of these halves, the same values should in each case result.

An inner part 32, which the measuring tube 4, the counteroscillator 28 as well as add-on parts (exciter mechanism 30, sensor arrangement 34, cross braces 24, 26, supplemental weights 40, 42, etc.) provided on the measuring tube 4 and the counteroscillator 28 have, is held, oscillatably, in a transducer housing 46 via the connecting tube pieces 10, 12. In this way is enabled a pendulum-like oscillation of the inner part 32 about the longitudinal axis z under torsion the two connecting tube pieces 10, 12. The transducer housing 46, embodied, as a rule, so as to be closed around the inner part 32 and the connecting tube pieces 10, 12, is presented partially sectioned in FIG. 1, so that the inner part 32 is visible. The transducer housing 46 is affixed on an inlet end of the inlet-side connecting tube piece 10, as well as on an outlet end of the outlet-side connecting tube piece 12. The transducer housing is, in comparison to the measuring tube 4, the counteroscillator 28 and the connecting tube pieces 10, 12, embodied in a bending- and torsionally stiff manner. In this way is implemented an as extensive as possible decoupling of the measuring transducer 2 from the pipeline (not shown) to be connected to the transducer housing 46. The transducer housing can additionally serve to hold an electronics housing (not shown) of a control electronics arrangement.

During operation of the measuring transducer 2, the measuring tube 4 is excited in the wanted mode—which usually is formed by the fundamental mode of the bending oscillation—by the exciter mechanism 30. In the fundamental mode of the bending oscillation (actually: bending-torsional oscillation), the measuring tube 4 moves in a pendulum-like manner about the longitudinal axis z in the manner of a cantilever clamped at one end. In a corresponding manner, the counteroscillator 28 is also excited in the fundamental mode of the bending oscillation (actually: bending-torsional oscillation) essentially opposite-phase to the measuring tube 4. The measuring tube 4 and the counteroscillator 28 then move in the manner of tuning fork tines oscillating opposite one another. According to an embodiment of the invention, the excitation frequency, in such case, is set in such a manner, that it corresponds as exactly as possible to the resonance frequency of the fundamental mode of the bending oscillation of the measuring tube 4. The excitation frequency, in the presence of the reference condition, which, as a rule, is formed by a measuring tube filled with water, also corresponds to the resonance frequency of the fundamental mode of the bending oscillation of the counteroscillator 28.

If a fluid flows through the measuring tube 4, then, as is explained above, oscillations are superimposed upon the wanted mode according to a second particular oscillation form (Coriolis mode). In the Coriolis mode, which is also referred to as the antisymmetric twist mode, the measuring tube 4 also performs alternating rotary oscillations about the vertical axis y. Due to this superpositioning of the wanted and Coriolis modes, there occurs between the inlet-side and the outlet-side end of the measuring tube 4 a phase difference, which is dependent on the mass flow. This phase difference can be registered via the sensor arrangement 34.

If the density of the fluid flowing in the measuring tube 4 deviates from the reference condition (as a rule, a measuring tube 4 filled with water), the force equilibrium between the measuring tube 4 and the counteroscillator 28 is disturbed. If the transverse forces resulting therefrom, which essentially act in the direction along the x-axis, cannot be compensated for, the inner part suspended on the two connecting tube pieces 10, 12 would be laterally deflected (i.e. essentially along the x-axis) from an assigned static installed position. In this way, forces would also act on the connected pipeline, which, among other things, due to reflections, would lead to a superpositioning of disturbing oscillations. This leads to a negative influencing of the accuracy of measurement of the measuring transducer 2. Additionally, the inner part held oscillatably in the transducer housing 46 has a lateral oscillation mode, in which, during operation, the inner part, along with a corresponding half-duplex bending of the connecting tube pieces 10, 12, oscillates relative to the transducer housing 46, wherein the inner part oscillates in a lateral or transverse direction (here: In the direction of the x-axis) about a resting position lying on the longitudinal axis z. In such case, forces and/or oscillations would also be transferred into the adjacent pipeline. This lateral oscillation mode would accordingly likewise lead to an unfavorable influencing of the accuracy of measurement. These effects would especially lead to a worsened zero point stability of the measuring transducer 2, which means that low flow rates no longer can be registered, or no longer can be registered exactly.

Additionally, the inner part 32, as is explained above in the general part of the description, can also oscillate in a pendulum-like oscillation mode about the longitudinal axis z under torsion of the two connecting tube pieces 10, 12. Through suitable coordination of the connecting tube pieces 10, 12 and the mass distribution of the inner part 32 in the region between the two connecting tube pieces 10, 12, the residual transverse forces, which potentially also affect the lateral oscillation mode, can be transformed to the greatest extent possible into the relatively uncritical pendulum-like oscillation of the entire inner part 32. In this way, the occurrence of disturbing oscillations, especially the occurrence of the lateral oscillation mode, can largely be suppressed.

As regards this matching, a simplifying manner of looking at the situation is again to be taken into consideration. Corresponding to the division illustrated in FIG. 3, the inner part is, for this purpose, divided by the plane formed by the x- and y-axis into two inner part halves. Each of these inner part halves, together with the respective adjoining connecting tube piece 10 or 12, forms a torsional oscillator, so that a first and a second torsional oscillator, which are coupled to one another, are obtained. Regarding each torsional oscillator, a torsional stiffness of the associated connecting tube piece 10 or 12 and a mass distribution of the inner part 32 in the region between the two connecting tube pieces 10, 12 are matched in such a manner, that the first torsional oscillator and the second torsional oscillator have a natural resonance frequency, which essentially corresponds to the resonance frequency of the wanted mode of the measuring tube 4. As regards the mass distribution, a mass moment of inertia of the respective torsional oscillator is especially to be matched about the longitudinal axis z. In the case of this mass moment of inertia, not only the measuring tube 4 and the counteroscillator arms 6, 8 as such are to be taken into consideration, but also all add-on parts mounted thereon (exciter mechanism 30, sensor arrangement 34, cross braces 24, 26, supplemental weights 40, 42, etc.). For matching the mass moment of inertia, correspondingly massively embodied coupling elements (e.g. node plates 22) in the two coupling zones 18, 20, correspondingly arranged supplemental weights 40, 42 or supplementally provided rotary mass balancing bodies 48, 50 can especially be provided.

Such additional rotary mass balancing bodies 48, 50 cart especially be rigidly affixed in the vicinity of the coupling elements (e.g. node plates 22) of the coupling zones 18, 20 on the respective connecting tube pieces 10, 12. In such case, each rotary mass balancing body 48, 50 in each case serves for matching the mass moment of inertia of the associated torsional oscillator. The rotary mass balancing bodies 48, 50 are, in the illustrated form of embodiment, embodied in a disc-shaped manner. Additionally, they are arranged concentrically to the longitudinal axis z, thus with the respective center of mass lying on the longitudinal axis z. Alternatively, however, they can also be placed eccentrically on the respective connecting tube piece 10, 12. The provision of rotary mass balancing bodies has, among other things, the advantage, that the counteroscillator arms 6, 8 themselves can be embodied relatively lightly.

Due to this matching of the pendulum-like oscillation mode of the two torsional oscillators to the wanted mode of the measuring tube 4 (and therewith also to the wanted mode of the counteroscillator 28) it is achieved that the pendulum-like oscillation mode is easily excited. Thus, the inner part 32 is seated during operation in such a rotationally soft manner, that it can be seen as practically being completely decoupled from the adjoining pipeline. Density-dependent imbalances lead therewith almost exclusively to a change in the instantaneous amplitude of the pendulum-like oscillations of the inner part 32, but not to—or only to negligibly small—lateral shiftings (i.e. essentially along the x-axis) of the inner part 32. Additionally, no transverse forces are thereby transmitted to the adjacent pipeline.

A suitable mass distribution of the measuring tube 4 (and, in given cases, add-on parts provided thereon), the counteroscillator 28 (and, in given cases, add-on parts provided thereon) and/or of the total inner part 32, as well as geometric dimensions of such derived therefrom, can, in order to fulfill one or more of the above explained criteria or conditions, especially be ascertained by means of finite element calculations and/or by means of corresponding calibration measurements.

The invention claimed is:

1. A measuring transducer of vibration-type for a fluid flowing in a pipeline, comprising:
   a curved measuring tube for conveying the fluid;
   a counteroscillator including two counteroscillator arms, which are arranged on both sides of said measuring tube, which, in each case, essentially follow a curve of said measuring tube, and which are coupled to one another in such a manner, that, during operation, they oscillate in phase with one another and are affixed to said measuring tube on an inlet side and an outlet side of said measuring tube, forming corresponding coupling zones; and
   an exciter mechanism, via which, during operation, said measuring tube and said counteroscillator are excitable to oscillations of opposite phase to one another, wherein:
   said counteroscillator arms are formed from a different material than said measuring tube;
   the material of said counteroscillator arms exhibits a thermal expansion coefficient essentially equal to that of the material of said measuring tube, and
   each counteroscillator arm includes at least one supplemental weight, which is arranged offset inwardly from a centroidal axis of said counteroscillator arm with respect to a total curvature of said counteroscillator arm.

2. The measuring transducer as claimed in claim 1, wherein:
   said counteroscillator and said measuring tube in each case exhibit a wanted mode, in which they are excitable by said exciter mechanism; and
   a resonance frequency of the wanted mode of said counteroscillator essentially corresponds to a resonance frequency of the wanted mode of said measuring tube.

3. The measuring transducer as claimed in claim 1 wherein:
   said two counteroscillator arms exhibit a curve and a mass distribution such that, during use, moments resulting from oscillation of said two counteroscillator arms are introduced into the two coupling zones at a same working angle as moments resulting from oscillation of said measuring tube.

4. The measuring transducer as claimed in claim 1, wherein:

said two counteroscillator arms exhibit a curve and a mass distribution such that, during use, the ratio of the moment introduced via said counteroscillator arms into a coupling zone to force introduced into the coupling zone via said counteroscillator arms, in each case, resulting from the oscillation of said two counteroscillator arms, is equal to the ratio of the moment introduced via said measuring tube into the coupling zone to force introduced into the coupling zone via said measuring tube, again, in each case, resulting from the oscillation of said measuring tube.

5. The measuring transducer as claimed in claim 1, wherein:
the material of said counteroscillator arms exhibits a lower density and a lower modulus of elasticity than the material of said measuring tube.

6. The measuring transducer as claimed in claim 1, wherein:
said measuring tube is formed from a first metal or from an alloy based on the first metal; and
said two counteroscillator arms are formed from a second metal different from the first metal or from an alloy based on the second metal.

7. The measuring transducer as claimed in claim 6, wherein:
the first metal is tantalum and/or the second metal is zirconium.

8. The measuring transducer as claimed in claim 1, wherein:
each counteroscillator arm exhibits a cross sectional profile essentially remaining the same over its length.

9. The measuring transducer as claimed in claim 1, wherein:
each counteroscillator arm is embodied tubularly.

10. The measuring transducer as claimed in claim 1, wherein:
the measuring transducer on the inlet and outlet sides of said measuring tube has, in each case, connecting tube pieces, via which said measuring tube communicates during use with the respective pipeline, and which are at least sectionally oriented along a shared longitudinal axis; and
via said connecting tube pieces, an inner part, which includes at least said measuring tube, said counteroscillator and said exciter mechanism, is held oscillatably in such a manner, that a pendulum-like oscillation of said inner part about said longitudinal axis under torsion of said two connecting tube pieces is enabled.

11. The measuring transducer as claimed in claim 10, wherein:
the measuring transducer has a transducer housing, in which the inner part is held oscillatably via said two connecting tube pieces.

12. The measuring transducer as claimed in claim 10, wherein:
a torsional stiffness of said connecting tube pieces and a mass distribution of said inner part in the region between said two connecting tube pieces are matched in such a manner, that a first torsional oscillator, with which a first half of said inner part in the region of said first connecting tube piece is associated, as well as a second torsional oscillator, with which the second half of said inner part in the region of said second connecting tube piece is associated, have a natural resonance frequency, which essentially corresponds to the resonance frequency of the wanted mode of said measuring tube.

13. The measuring transducer as claimed in claim 1, wherein:
said two counteroscillator arms, said measuring tube, the coupling zones and said connecting tube pieces are arranged mirror-symmetrically with respect to a symmetry plane which is defined by the curve of said measuring tube.

* * * * *